Figure 1:
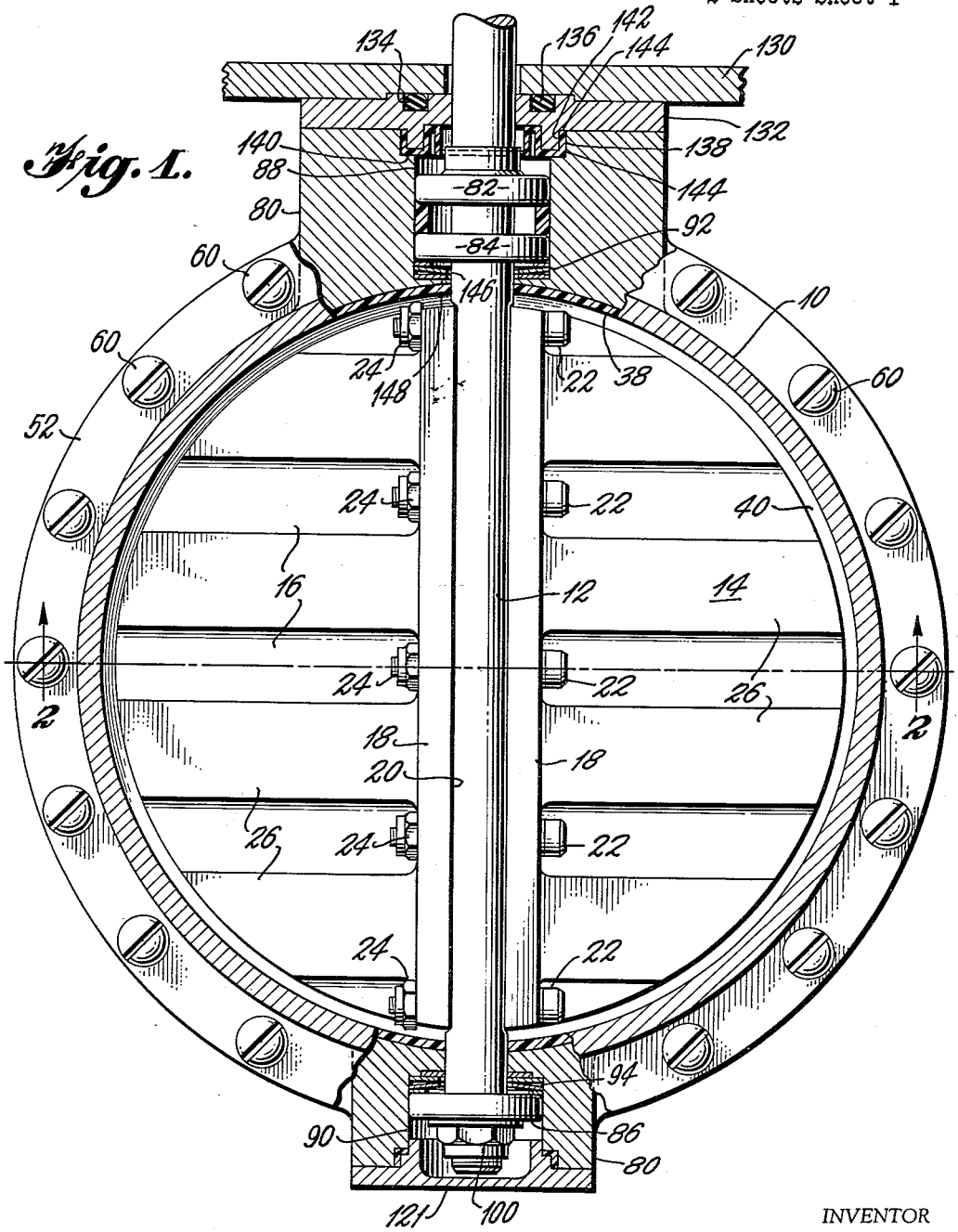

July 2, 1963

J. T. FISHER 3,096,071

BUTTERFLY VALVE HAVING RESILIENT SEALING MEANS

Filed May 16, 1960

2 Sheets-Sheet 2

INVENTOR

*John T. Fisher*

BY *A. G. Douvas*

ATTORNEY

United States Patent Office 3,096,071
Patented July 2, 1963

3,096,071
BUTTERFLY VALVE HAVING RESILIENT SEALING MEANS
John T. Fisher, Indianapolis, Ind., assignor to Stewart-Warner Corporation, Chicago, Ill., a corporation of Virginia
Filed May 16, 1960, Ser. No. 29,537
2 Claims. (Cl. 251—306)

This invention relates to a butterfly valve for controlling the flow of cryogenic fluids in a conduit under extremely low temperature conditions and more particularly to structural modifications of such a valve with a flexible seal which particularly adapt it for efficient operation under these low temperature conditions.

The transportation of cryogenic fluids at extremely low temperatures from one place to another through a conduit is most often accomplished intermittently. This being the case, the temperature extremes to which the transportation apparatus is subjected is quite severe. One particularly vital part of the transportation apparatus which is affected by these temperature extremes is the means for controlling the flow of the low temperature fluid, usually taking the form of a valve. A butterfly valve seems particularly appropriate. In such a valve the valve seat is mounted on the interior of the conduit and defines an opening. In this opening is mounted a disc member adapted to rotate from a full open or in-line position within the conduit to a position at right angles thereto for closing off the flow of the liquefied gas. In order to improve the engagement between the valve and the valve seat to overcome the normally deleterious effects of wide temperature variations, certain modifications of the valve and valve seat are proposed to this invention. These modifications substantially eliminate leaks which might occur between the valve and the valve seat and undesirable frictional loads which might occur between these elements, both of which factors are largely attributable to the difference in coefficient of expansion between materials comprising the valve and valve seat and the different properties they exhibit at extreme low temperatures. Past efforts to eliminate these deficiencies have taken the form of anti-friction bearings such as ball bearings and the use of a material having some resilience at cryogenic temperatures as the sealing means on one of the valves sealing surfaces. However, such attempts have not been highly successful because of the fact that water vapor or other condensate coming in contact with the bearings freezes as the temperature passes through 32° F. to bind the bearing or at least to substantially increase the friction losses thereof. Further because the use of a resilient material such as "Kel F" with metal to form the sealing surfaces has presented such a problem in their different coefficients of expansion that proper sealing was difficult to accomplish. The use of a plastic material and metal tends to scratch or scour the softer material resulting in leaks. The use of metal as the resilient material also tends to scratch the sealing surfaces and a metal-to-metal seal will result in very high frictional forces to move the butterfly.

It is therefore the primary object of this invention to provide an improved valve structure for controlling the flow of cryogenic fluids under extremely low temperature conditions.

It is a further object of this invention to provide a valve structure for controlling the flow of cryogenic fluids under extremely low temperature conditions with minimum pressure loss to the cryogenic fluids passing through the valve.

It is a further object of this invention to provide a greatly improved butterfly valve for controlling the flow of cryogenic fluids under extremely low temperature conditions insuring minimum leakage when the valve is in the closed position.

It is a further object of this invention to provide a greatly improved valve structure for controlling the flow of a fluid which is suitable for use at the extreme temperature ranges from 165° F. to −452° F.

It is a further object of this invention to provide a greatly improved butterfly valve for controlling the flow of cryogenic fluid under extremely low temperature conditions which requires a minimum force at all times to open and close the valve regardless of the temperatures to which the structure is subjected.

Other objects of this invention will be pointed out in the following detailed description and claims and illustrated in the accompanying drawings which disclose, by way of example, the principle of this invention and the best mode which has been contemplated of applying that principle.

Figure 2:
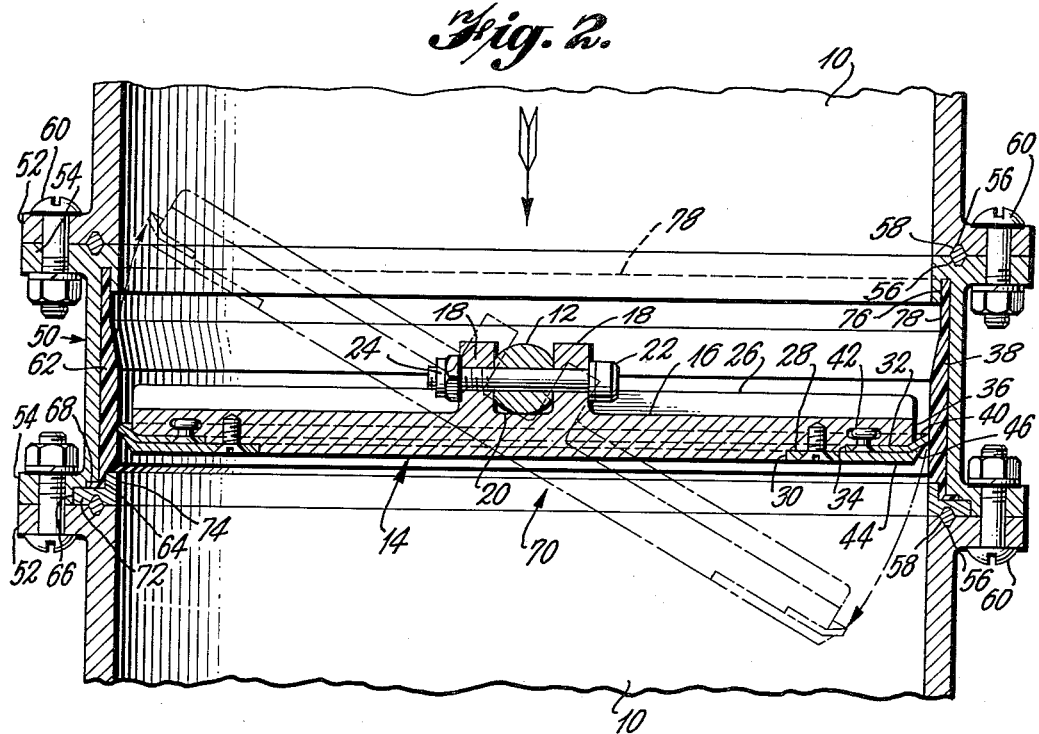
Figure 3:
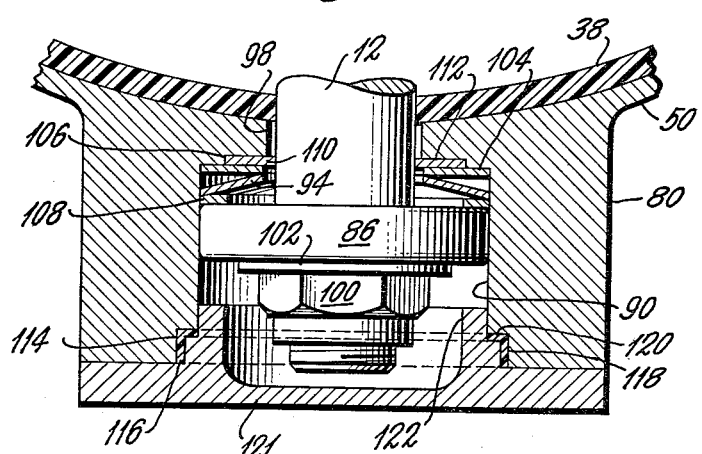

In the drawings:
FIGURE 1 is a front elevational view of a preferred embodiment of this invention;
FIGURE 2 is a top sectional view of the embodiment shown in FIGURE 1, taken along lines 2—2;
FIGURE 3 is an enlarged view of a portion of the apparatus shown in FIGURE 1 showing the mounting and sealing arrangement for the butterfly valve operating shaft.

In general, the apparatus of this invention comprises a butterfly valve including a central, vertically positioned, rotatable shaft rigidly coupled to a reinforced butterfly disc member adapted to rotate from a fully open, or in-line position, within a cylindrical conduit to a position at right angles thereto for closing off the flow of cryogenic fluid. A flexible lip seal or resilient annulus of plastic material is rigidly coupled to the outer periphery of the disc member and makes contact with a cylindrical valve seat member embraced by the conduit which is also formed of resilient plastic material having similar coefficient of expansion and low temperature properties with both plastic members retaining flexibility, even at the extremely low temperatures to which the valve structure is subjected. The axis of the vertical support shaft is upstream slightly from the contact plane of the lip seal member allowing the valve to move quickly away from the seat to prevent its vibrating or sticking against the cylinder wall. Because of the differences in the expansion rate of the materials making up the valve structure, the butterfly valve supporting shaft is located in the shaft axial plane by means of Belleville-type springs allowing the shaft, butterfly, or valve body to grow or shrink relative to any other part with no resultant binding of parts. The structure may include sealing means on either side of the anti-friction bearings supporting the shaft within the valve housing to insure against moisture freezing into ice within the bearing races. The valve structure just described is therefore particularly adaptable to controlling the flow of a cryogenic fluid such as liquid oxygen wherein the valve structure is subjected to extremely large temperature variation.

Referring now to the drawings, the cryogenic fluid valve of the present invention is adapted to be used with an elongated cylindrical conduit 10 formed of a metal such as steel or the like. A butterfly type of valve has been found to require the smallest total overall volume, including mechanism, for a given free flow area and lowest pressure drop when in the open position. The butterfly valve consists in this case of a transverse shaft 12 which is mounted vertically within a short portion 50 of the horizontal conduit 10. The shaft 12 is rigidly coupled to a disc or butterfly member 14 which extends laterally across the conduit. The butterfly member 14 consists of a single element metallic disc of cast metal construction or the like, including a series of lateral groove portions 16 extending inward from the outer periphery of the upstream face of the butterfly member. In order to rigidly couple the butterfly member 14 to the vertical shaft 10, there is provided a pair of integral, vertical flanges 18 which form a central recess 20, the flanges 18 acting to embrace the shaft 10 within the recess 20. Suitable mounting bolts 22 extend laterally through both the flange members 18 and the central shaft 10, the bolts 22 including nuts 24 allowing the butterfly member 14 to be rigidly secured to the rotating shaft member 12 at five different locations along the axis of the shaft. A number of reinforcing ridges 26 are formed between the grooves 16, the alternate placement of grooves 16 and ridges 26 acting to provide a one-piece butterfly member having extreme rigidity regardless of the pressures exerted by the low temperature liquefied gas within the conduit 10. While butterfly valve designs are known widely for their use in systems requiring low-pressure loss as the liquid flows through the valve when the valve is in the fully open position, it has been found that valve structures of this type have a disadvantage when used in applications where there is an extreme variation in temperature. The valves have a great tendency to freeze in either the extreme open or closed positions or even at points intermediate thereof. This can easily be seen when viewing FIGURE 1 which shows the valve in a closed position wherein full peripheral contact over 360° of the peripheral surface of the butterfly member 14 would, of necessity, require equal expansion and contraction of the stationary and moving portions of the valve structure if metal-to-metal contact existed between the conduit 10 and the butterfly 14. Since there is no assurance that these members will contract and expand at equal rates, or that the full sealing contact will exist throughout the temperature range, the present invention incorporates a lip seal composed of a plastic material while the inner surface of the stationary portion of the valve forming the valve seat is provided with a material also composed of plastic, having the same thermal rate of expansion, to enable both the moving element and the stationary element to retain flexibility or resilience regardless of the low temperature to which the elements are subjected. Referring to FIGURE 2 of the drawings, the butterfly or disc member 14 includes a first undercut, peripheral portion 28 forming an abutment 30 and a second undercut portion 32 forming an abutment 34, the second undercut portion 32 being of less radial distance from the peripheral edge 36 of butterfly 14 than undercut portion 28. It should be noted that the diameter of the metallic butterfly disc 14 is slightly less than the internal diameter of conduit portion 50 which is also the same diameter as that of the valve seat member 38. Thus, at no time does the butterfly disc member 14 contact the valve seat 38, even when the valve is in the fully closed position. The flexible lip seal 40 comprises a relatively thin resilient annulus of flexible plastic material such as Kel-F, the annulus being positioned within the second undercut portion 32 with its inner peripheral surface contacting the abutment 34 and its outer peripheral surface contacting the valve seat member 38. Suitable members such as retaining rings 42 act to hold the annular lip seal member 40 in contact with the metallic butterfly 14. In order to prevent the flexible lip seal from folding back upon itself, creating leakage, the lip seal is supported on the downstream side by a semi-rigid support member 44 which is positioned within the first undercut or recess 28 with its inner peripheral edge contacting abutment 30 and its forward portion including an inwardly directed lip portion 46 which tends to force the flexible sealing annulus 40 inwardly at some angle of inclination with respect to the laterally extending butterfly member 14 and the valve seat member 38. The semi-rigid support member 44 extends as close as possible to the inner peripheral surface of the seat member 38 as is compatible with the free-turning of the valve member 14 but is spaced a sufficient distance from the seat member 38 as to allow contact to exist only between the flexible lip seal 40 and the cooperating seat member 38.

It is advantageous to provide a valve structure where the valve member moves as quickly away from the seal as possible during opening of the valve. The present invention provides for this requirement by allowing the valve to be pivoted slightly upstream from the plane of of the lip seal. Referring to FIGURE 2, the plane of contact of the butterfly valve lies along a line passing through the butterfly valve member 14 some distance downstream from the axis of the rotating shaft 12. In effect, this places the contact area of the lip seal at some angle with respect to the stationary valve seat member 38 rather than being perfectly perpendicular to this member when the valve is in a fully closed position. This allows the lip seal 40 on the right side of the shaft 12, FIGURE 2, whch moves downstream, to move quickly away from the cooperating seat member 38 when the valve is opening. This acts to prevent its vibrating or chattering against the seat member 38. In like manner, further opening of the valve automatically allows the lip seal 40 on the left side of the shaft 12, FIGURE 2, to move more quickly away from the seat member 38 in this area due to the tapered portion 37 of the valve seat member. The effect of the particular flexible lip seal construction employed in the butterfly valve of this invention acts to protect the seal from deterioration and destruction during use, especially under the extreme conditions encountered in controlling the flow of a cryogenic fluid.

The present invention is particularly useful for a valve which is employed in systems operating through extensive temperature differences. In order that the disc-like butterfly valve 14 may be free to grow or shrink in relation to the conduit 10, as well as to provide an effective seal which will operate under all conditions regardless of the temperature to which the relative moving parts are subjected, there is employed a valve seat or member 38 formed as a cylindrical seal which may be constructed of a suitable plastic having the desired properties such as Teflon. The use of a flexible lip seal member 40 and a cylindrical seal 38 which is also made of plastic such as Teflon allows both members to retain a certain flexibility even under low temperature conditions. This results in reducing the friction to a minimum at the point of contact of the moving lip seal 40 and the stationary valve seat member 38 while at the same time insuring full and complete sealing of the valve. In order to securely mount the Teflon cylindrical seal member 38 along the inner peripheral surface of casing or conduit 10, there is provided a special section of this conduit indicated generally at 50. The end of each of the conduit sections 10 includes an outwardly directed radial flange 52 which is adapted to abut a like flange 54 formed on either end of the short cylindrical member 50. Each pair of flanges 52 and 54 have a suitable V-shaped groove within their abutting surfaces as at 56 and the cooperating grooves receive a metal O-ring or similar sealing means 58 which act to prevent radial leakage of the fluid passing through the conduits 10. Suitable clamping members such as bolts 60 are provided for securing the shortened section 50 to the rest of the conduit sections 10 in rigid relation. To achieve a leak-free sealing cylinder, the sealing cylinder or seat member 38 is specially mounted on the cylindrical section 50 such that the main portion of the sealing cylinder may be free to expand or contract with temperature variations. This along with the fact that the contact portion of the butterfly valve is formed of a like material having similar characteristics results in extremely low leakage regardless of the temperature to which the valve structure is subjected. The short conduit section 50 is formed with a generally longitudinal flat surface 62 which receives the sealing cylinder and is further formed at the downstream end with a first enlarged diameter section indicated generally at 68 and a second enlarged diameter section at 66, formed within the lower flange 54 of the conduit section 50. A cooperating annular ring member which is formed of a metal similar to that of conduit sections 10 and 50 is of general L-shaped configuration in cross section, including an outwardly directed base portion 72 and a longitudinally directed section 74. The annular ring member 70 cooperates with the enlarged diameter sections 66 and 68 of member 50 to form a leak-free pocket for receiving the downstream end 64 of the sealing cylinder 38. At the upper end of conduit 50 there is formed, within upper flange portion 54, a longitudinal groove 76 acting to receive the upper end 78 of the sealing cylinder 38. In this manner, the main portion of the sealing cylinder is free to expand or contract with temperature change in either a radial or longitudinal direction, insuring low leakage regardless of the temperature to which the structure is subjected.

Because of the extensive temperature differences which are involved in controlling the flow of a liquefied gas where the ambient temperature may be as high as 165° F. and the temperature of the liquefied gas may be as low as −452° F., all of the elements must be free to grow or shrink in relation to the other parts without mechanical binding. In the use of a butterfly-type valve as employed in this invention, the shaft must be so mounted that the butterfly valve element 14 is free to rotate regardless of the temperature, or temperature differences of any of the elements. The present butterfly valve includes the use of support means allowing the shaft to be moved laterally or transverse to the flow of fluid along the same line as the axis of the shaft. A resilient mounting principle allows the shaft to move automatically in response to stress caused by growth or shrinking of the elements making up the valve structure, with the valve member 14 freely movable at all times. The butterfly valve supporting shaft 12 is mounted within a valve casing 80 on three anti-friction bearings of the ball bearing types 82, 84, and 86, FIGURE 1, such that the shaft is allowed to freely rotate within the casing with the axis of rotation lying along a line drawn vertically through the center of the conduit section 50. The inner races of the ball bearing members 82, 84, and 86 are to float along the shaft 12, while the outer races are frictionally held within an upper bore 88 and a lower bore 90 formed centrally of the casing member 80. In order to make the butterfly valve 14 and its rotating shaft 12 free floating, a pair of Belleville-type springs are positioned at each end of the shaft adjacent the ball bearing members 84 and 86. The upper Belleville spring 92 and the lower spring 94 exert axial compressive forces tending to keep the shaft 12 centered within the conduit 10 but the flexure of the springs allows the shaft to move axially for locating the point at which the valve is free to turn on the valve seat member with minimum effort, regardless of variation in temperature.

The bearings 82, 84, and 86 at both ends of the shaft are sealed from contact with the flowing medium such as liquefied gas and the ambient by suitable sealing means. The means employed in the upper and lower end of the valve structure are similar, and reference to FIGURE 3 which shows an enlarged portion of FIGURE 1 discloses the means for mounting the vertical shaft within the casing member 80. The shaft 12 is located centrally of casing member 80 and passes first through bore 98 which is of a diameter slightly greater than the diameter of shaft 12 at this point. A second bore 90 is of somewhat greater diameter and is adapted to receive the supporting ball bearing member 86. The inner race of bearing 86 is free to move on the shaft but secured by the means of a conventional nut 100 and washer 102. The shaft is allowed to move in an axial direction slightly in response to variations in temperature to locate the butterfly valve 14 centrally of conduit 50 by the use of Belleville-type springs 94 which exerts an upward compressive force on shoulder 104 formed intermediate of bore 98 and bore 90, while subjecting the ball bearing race member 86 to a downward compressive force on the ball bearing member 86 near its outer periphery. A pair of washer members 106 and 108 are positioned on each side of the Belleville spring 94, and a sealing member 110 is mounted in a suitable annular undercut portion 112 of the shoulder 104. The seal 110 prevents the ingress of the low-temperature fluid such as liquefied gas passing through the valve proper into bore 90 and coming into contact with the ball bearings 86. The lower end of casing member 80 terminates in a bore 114 which is of slightly greater diameter than bore 90 forming an annular recess for receiving a Teflon seal member 116. The Teflon seal member is of generally L-shaped configuration contacting a radial surface 118 and an axial surface 120 formed within casing 80 as a result of enlarged bore 114. A generally dis-shaped end cap 120, which is formed of metal or the like, includes an inwardly directed flange portion 122 having an external diameter slightly less than the diameter of recess 14 and a second external diameter at the extreme forward portion of the flange approximately the same as the diameter of bore 90, creating a sealing pocket which acts to compress the Teflon seal member 116 within the pocket as the end cap is rigidly connected to the casing portion 80, thus sealing the bearing 86 from the ambient. The sealing member 110 and the sealing member 116 therefore act to isolate the bearing cavity from both the fluid passing through the conduit 10 and the ambient atmosphere. Any moisture which would normally seep into the bearing is therefore prevented from entering and freezing as the temperature of the assembly passes from 165° F. through 32° F. or the freezing point of water to temperatures in the range of −452° F. This would normally result in the formation of ice particles within the bearing, either preventing rotation of the valve or at least causing excessive wear to the moving elements of the bearing structure.

The valve assembly is shown attached to a generally horizontal support member 130 which may be a portion of the same means for supporting the mechanism (not shown) acting to turn the valve shaft 12 when the valve is to be opened or closed. Members coupling the casing portion 80 to a support member 130 are not shown but may consist of clamping members such as bolts or the like. An intermediate disc member 132 acts to provide an effective seal between the stationary support member 130 and the valve proper by including an annular groove 134 adapted to receive an O-ring or other sealing means 136. The upper end of casing 80 includes an annular undercut section 138 forming an abutment surface 140 which acts in conjunction with undercut portion 142 of member 132 to form a suitable sealing pocket for receiving a Teflon sealing member 144 acting to prevent the ingress of moisture from the atmosphere into the cavity or bore 88 carrying the twin ball bearing structures 82 and 84. A second annular sealing member 146 is positioned between the Belleville-type spring 92 and a lower inwardly directed flange 148 formed integrally of the casing 80 to prevent high pressure fluid from the conduits 10 and 50 from entering into the bearing-receiving bore 88.

With this construction, there is provided an extremely effective readily movable, butterfly valve for controlling the flow of a liquefied gas at extremely low temperatures requiring a minimum of expenditure of energy to open or close the valve, while obtaining low pressure loss through the valve under full flow conditions. At the same time, the valve structure is suitable for use at extreme temperature ranges from a maximum of 165° F. to a minimum of −452° F., with minimum or zero leakage because of the unique use of contact surfaces formed of plastic material in which the flexibility of the materials is retained even at low temperatures. Even under extreme temperature changes, with the elements making up the valve structure expanding and contracting at different rates, the use of flexible mounting means allows the butterfly valve to shift axially relative to the stationary casing and to seek an equilibrium position resulting in continued minimum energy requirements for movement of the valve from an open to closed position, or vice versa. The present system also provides an advantageous arrangement for sealing off the ball bearings supporting the rotating shaft from both ambient and the moving fluid to prevent freezing of condensate within the bearing structure preventing interference with the rotation of the valve within the casing.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A butterfly-type valve, comprising a conduit defining a flow passage, a cylindrical valve seat disposed within the conduit and about a plane normal to the longitudinal axis of the flow passage, a butterfly disc member disposed within the flow passage alignable with the valve seat and having an outer peripheral dimension smaller than the valve seat, mounting means spaced from said plane and diametrical of the valve seat adapted to rotate the disc member to a valve closed position aligned with the valve seat and to a valve opened position normal to said valve closed position, a flexible annulus of substantially uniform section secured to the disc member and having a generally cylindrical outer peripheral dimension larger than the valve seat and seatable therewith in the valve closed position to close the flow passage, and a rigid annulus secured to the disc member on the downstream side of the flexible annulus in the valve closed position, the outer peripheral dimension of the rigid annulus being smaller than the valve seat and diverging outwardly from the disc member in an upstream direction in the valve closed position against the flexible annulus to slope the overlapping flexible annulus with respect to the valve seat and to the disc member.

2. A butterfly valve, comprising a conduit defining a flow passage, a cylindrical valve seat disposed within the conduit and about a plane normal to the longitudinal axis of the flow passage, a butterfly disc member disposed within the flow passage alignable with the valve seat and having an outer peripheral dimension smaller than the valve seat, mounting means spaced from said plane and diametrical of the valve seat adapted to rotate the disc member to a valve closed position normal to the longitudinal axis of the valve seat aligned with the valve seat and to a valve opened position normal to said valve closed position, a flexible annulus of substantially uniform section and having a generally cylindrical outer peripheral dimension larger than the valve seat and seatable therewith in the valve closed position to close the flow passage, said spaced mounting means moving said flexible annulus toward the seating position initially in a non-tangent relationship, the outer peripheral dimension of the rigid annulus being smaller than the valve seat and diverging outwardly from the disc member in an upstream direction in the valve closed position against the flexible annulus to slope the overlapping flexible annulus with respect to the valve seat and to the disc member.

References Cited in the file of this patent
UNITED STATES PATENTS

| | | |
|---|---|---|
| 2,488,380 | Danks | Nov. 15, 1949 |
| 2,586,927 | Frantz | Feb. 26, 1952 |
| 2,776,104 | Sinkler | Jan. 1, 1957 |
| 2,835,268 | Dillberg | May 20, 1958 |
| 2,924,424 | Titterington | Feb. 9, 1960 |

FOREIGN PATENTS

| | | |
|---|---|---|
| 73,467 | France | Sept. 5, 1960 |
| 1,047,554 | Germany | Dec. 24, 1958 |
| 1,125,411 | France | July 16, 1956 |

OTHER REFERENCES

"Chemical & Engineering News," vol. 30, No. 26, June 30, 1952, pp. 2688–2691 (251—268) (copy in Scientific Library).